(12) United States Patent
Ichimaru

(10) Patent No.: US 7,374,220 B2
(45) Date of Patent: May 20, 2008

(54) DRIVE DEVICE FOR DRIVING TWO MEMBERS AND SHIELDING SYSTEM FOR VEHICLE

(75) Inventor: Takahide Ichimaru, Chigasaki (JP)

(73) Assignee: Nifco Inc., Yokohama (JP)

( * ) Notice: Subject to any disclaimer, the term of this patent is extended or adjusted under 35 U.S.C. 154(b) by 235 days.

(21) Appl. No.: 11/118,387

(22) Filed: May 2, 2005

(65) Prior Publication Data

US 2005/0253405 A1 Nov. 17, 2005

(30) Foreign Application Priority Data

May 14, 2004 (JP) ............................. 2004-144723

(51) Int. Cl.
*B60R 7/04* (2006.01)

(52) U.S. Cl. ............... 296/37.1; 296/24.34; 296/37.8; 296/37.12

(58) Field of Classification Search ............... 296/37.1, 296/37.5, 37.8, 37.12, 24.34, 37.7; 248/551
See application file for complete search history.

(56) References Cited

U.S. PATENT DOCUMENTS

| | | | | |
|---|---|---|---|---|
| 4,854,632 A * | 8/1989 | Kreuze et al. | ............ | 296/37.12 |
| 4,941,718 A * | 7/1990 | Alexander et al. | ............ | 312/312 |
| 5,102,181 A * | 4/1992 | Pinkney | .................... | 296/37.12 |
| 5,184,489 A * | 2/1993 | Squires et al. | .................. | 70/58 |
| 6,241,300 B1 * | 6/2001 | Suzuki | ....................... | 296/37.8 |
| 6,295,883 B1 * | 10/2001 | Tsukada et al. | ............ | 74/89.18 |
| 6,449,788 B1 * | 9/2002 | Nichols | ......................... | 5/636 |
| 6,572,209 B2 * | 6/2003 | Koepff et al. | ............ | 312/319.5 |
| 6,715,815 B2 * | 4/2004 | Toppani | .................... | 296/37.12 |
| 7,025,225 B2 * | 4/2006 | Inari | .......................... | 220/830 |
| 7,044,529 B2 * | 5/2006 | Svenson et al. | ........... | 296/37.8 |
| 7,065,829 B2 * | 6/2006 | Okabayashi et al. | ........... | 16/51 |
| 7,120,605 B2 * | 10/2006 | Guillemin et al. | ............ | 705/62 |
| 7,125,063 B2 * | 10/2006 | Kawamoto et al. | ........ | 296/37.8 |
| 7,163,249 B2 * | 1/2007 | Schmidt et al. | .......... | 296/37.12 |
| 7,168,749 B2 * | 1/2007 | Schmidt et al. | .......... | 296/24.34 |
| 7,201,420 B2 * | 4/2007 | Vican | ....................... | 296/37.12 |
| 2002/0101091 A1 * | 8/2002 | Ito | .......................... | 296/37.12 |
| 2003/0052129 A1 * | 3/2003 | Fukuo | ......................... | 220/350 |
| 2003/0080131 A1 * | 5/2003 | Fukuo | ......................... | 220/264 |
| 2005/0206182 A1 * | 9/2005 | DePue et al. | ............. | 296/37.12 |
| 2005/0248170 A1 * | 11/2005 | Kawamoto et al. | ...... | 296/24.34 |
| 2006/0012202 A1 * | 1/2006 | Sakakibara et al. | ...... | 296/24.34 |

FOREIGN PATENT DOCUMENTS

JP HEI 05-21498 6/1993

\* cited by examiner

*Primary Examiner*—Dennis H. Pedder
*Assistant Examiner*—Gregory Blankenship
(74) *Attorney, Agent, or Firm*—Manabu Kanesaka

(57) ABSTRACT

A drive device for driving two members includes one drive source; a rotating member connected to the drive source; and a drive member connected to the rotating member via a coupling device. The drive member stops upon releasing the connection from the rotating member via the coupling device after moving for a predetermined distance in synchronicity with the rotating member. The rotating member and the drive member drive the two members, respectively.

10 Claims, 10 Drawing Sheets ly. The present invention also relates to a shielding
DRIVE DEVICE FOR DRIVING TWO MEMBERS AND SHIELDING SYSTEM FOR VEHICLE

BACKGROUND OF THE INVENTION AND RELATED ART STATEMENT

The present invention relates to a drive device for driving two members in which a single drive source opens/closes or slides a shutter member for opening and closing an opening of a storage section in a vehicle, a cover for opening and closing a portion of the storage section, or a storage member for sliding back and forth within the storage section, so that, for example, an electronic system installed in the vehicle becomes invisible from outside through a window of the vehicle. The present invention also relates to a shielding system for a vehicle having the drive device for driving two members for opening/closing or sliding a shutter member, cover, or storage member.

In recent years, an electronic equipment such as navigation system and audio system installed in a parked vehicle has been often stolen. One of contributing factors may be that such a system installed in a vehicle is visible from outside through a window. In order to shield and make the system installed in a vehicle invisible, an installation rack has been proposed (Patent Reference 1). The installation rack includes a storage space for storing an article; a rack main body having a front opening, a shutter for opening and closing the storage space, a first drive mechanism for opening and closing the shutter, a slide member disposed in the rack main body to be slidable in a longitudinal direction; and a second drive mechanism for sliding the slide member.

Patent Reference 1: Japanese Utility Model Publication (Kokoku) No. 05-21498

The conventional installation rack described above is provided with motors each driving the first drive mechanism for opening and closing the shutter and the second drive mechanism for sliding the slide member. Accordingly, it is necessary to provide a space for installing the two motors, thereby making it difficult to use a space effectively and increasing cost of the installation rack due to the two motors.

In view of the problems described above, an object of the present invention is to provide a drive device for driving two members provided with a single drive source.

Further objects and advantages of the invention will be apparent from the following description of the invention.

SUMMARY OF THE INVENTION

In order to attain the objects described above, according to the present invention, a drive device for driving two members includes one drive source; a rotating member connected to the drive source; and a drive member connected to the rotating member via a coupling device that stops upon releasing the connection from the rotating member via the coupling device after moving for a predetermined distance in synchronicity with the rotating member. The rotating member and the drive member drive the two members, respectively.

In the drive device for driving two members, the coupling device comprises a projection disposed on the rotating member with a sheet shape and a groove or slit provided in the drive member for guiding the projection. The drive member is connected to the rotating member to be movable in a radial direction of the rotating member. The drive source includes a motor, and the motor is controllable to perform normal or reverse rotation around a point at which the connection between the rotating member and drive member via the coupling device is released.

According to the present invention, a shielding system for a vehicle includes a shutter member for opening and closing an opening of a storage section of the vehicle as the driven member driven by the drive member and a cover for opening and closing a portion of the opening of the storage section as the driven member driven by the rotating member. The drive device for driving two members opens and closes the shutter member and cover.

According to the present invention, a shielding system for a vehicle includes a shutter member for opening and closing the opening of a storage section of the vehicle as the driven member driven by the drive member and a cover for opening and closing a portion of the opening of the storage section as the driven member driven by the rotating member. The drive device for driving two members opens/closes the shutter member and slides the cover.

In the drive device for driving two members of the present invention, the single drive source drives the rotating member and drive member, which respectively drive the driven members. Accordingly, it is possible to reduce a space for disposing the drive source, thereby efficiently using the storage space and reducing cost of the drive device for driving two members. The coupling device comprises the projection disposed on the rotating member with a sheet shape, and the groove or slit is disposed in the drive member to guide the projection. Accordingly, it is possible to use a space efficiently and improve exterior design.

The drive member is connected to the rotating member so as to be movable in the radial direction of the rotating member. Accordingly, it is possible to use a space efficiently and improve exterior design. Furthermore, the motor is employed as the drive source, and the motor is controlled to perform normal or reverse rotation around the point at which the connection of the rotating member and the drive member via the coupling device is released, thereby making the drive source inexpensive.

In the shielding system for a vehicle of the present invention, the member driven by the drive member is the shutter member for opening and closing the opening of the storage section in a vehicle. The member driven by the rotating member is the cover for opening and closing a portion of the storage section. The shutter member and the cover are operated by the drive device for driving two members. Alternatively, the member driven by the drive member is the shutter member for opening and closing the opening of the storage section in a vehicle, and the member driven by the rotating member is the storage member sliding back and forth within the storage section. The shutter member is operated and the storage member is slid by the drive device for driving two members. Accordingly, it is possible to reduce a space for disposing the drive source, efficiently use the storage space, and reduce cost of the shielding system for a vehicle.

DETAILED DESCRIPTION OF PREFERRED EMBODIMENTS

Figure 1:
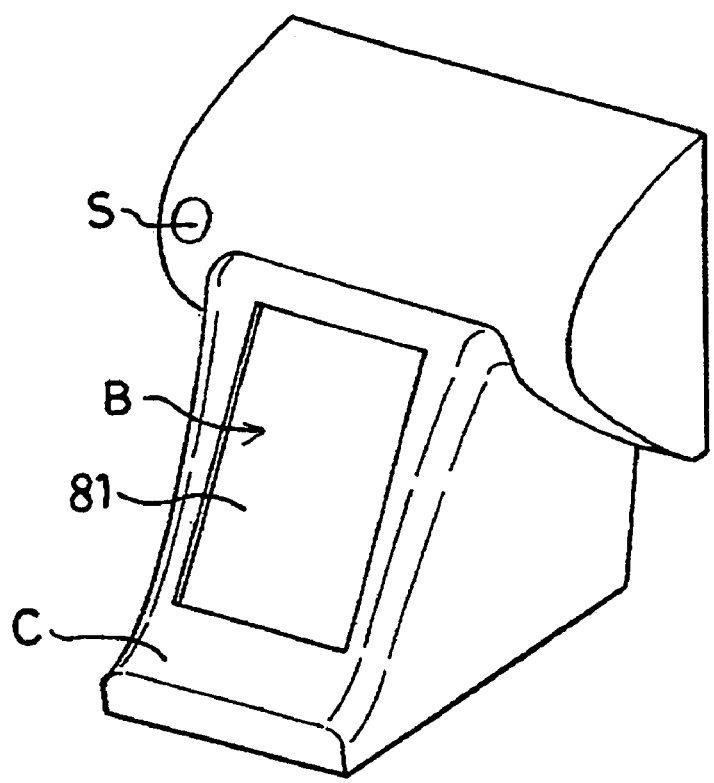
FIG. 1 is a view showing a shielding system for a vehicle disposed in a center console with a shutter member closed according to an embodiment of the present invention.
Figure 2:
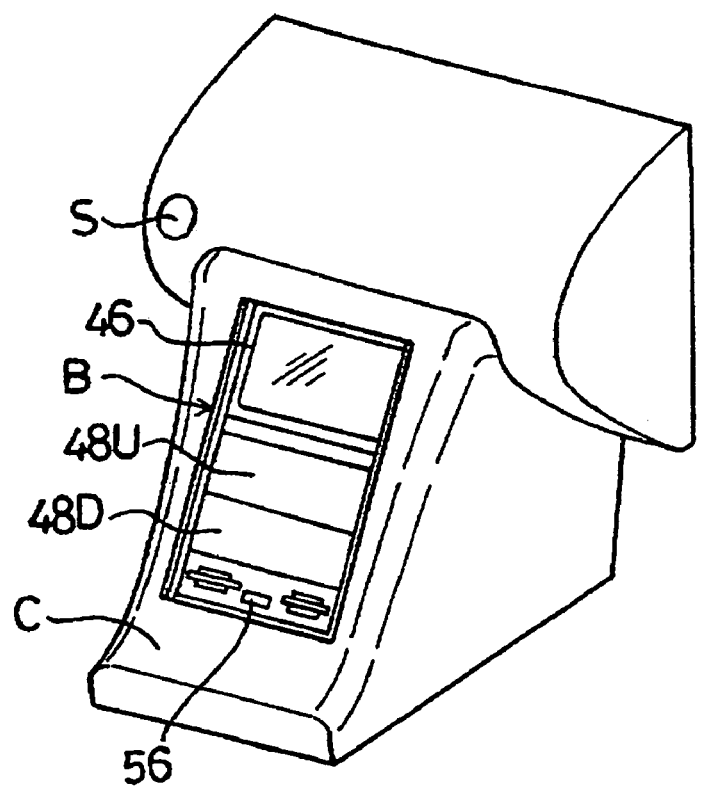
FIG. 2 is a view showing the shielding system for a vehicle disposed in the center console with the shutter member open according to the embodiment of the present invention.
Figure 3:
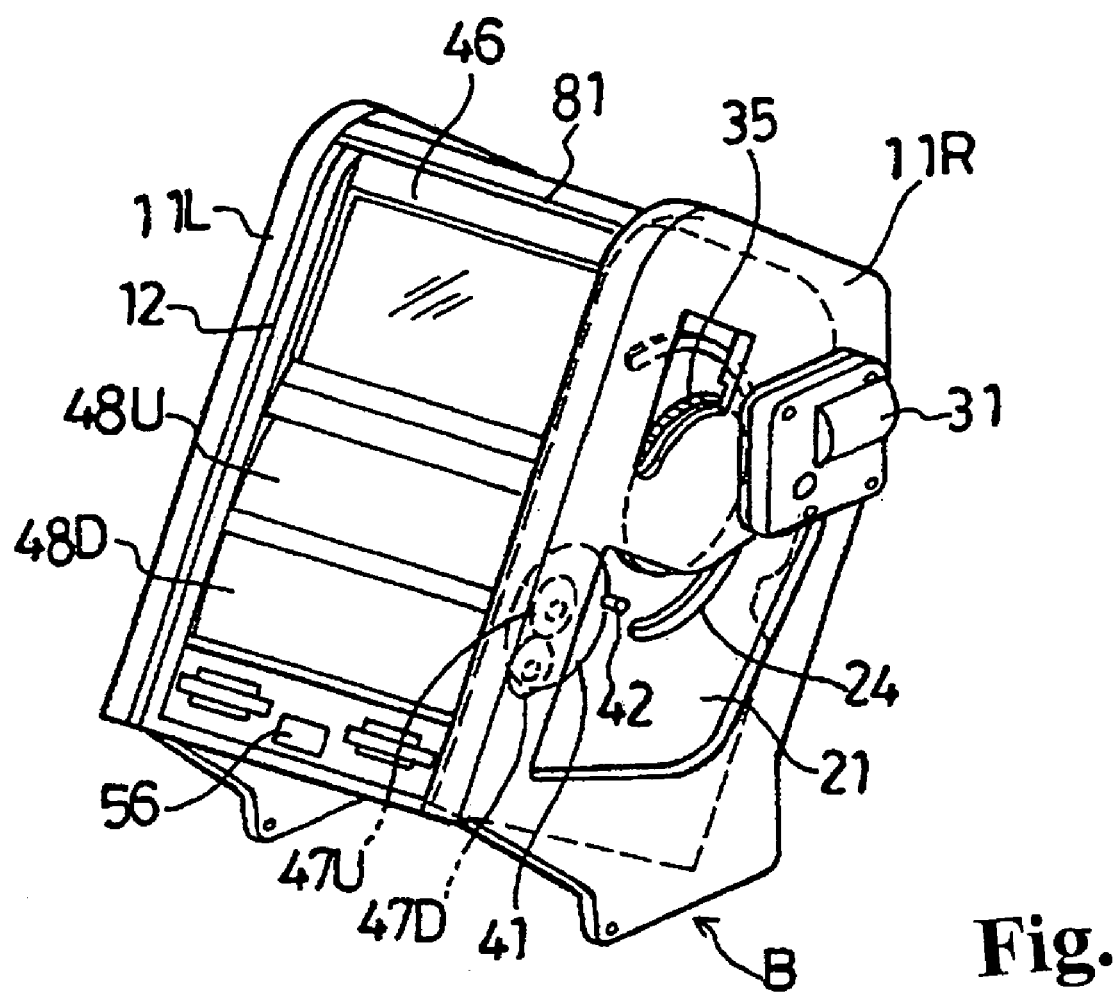
FIG. 3 is a view showing the shielding system for a vehicle with the shutter member open as shown in FIG. 2.
Figure 4:
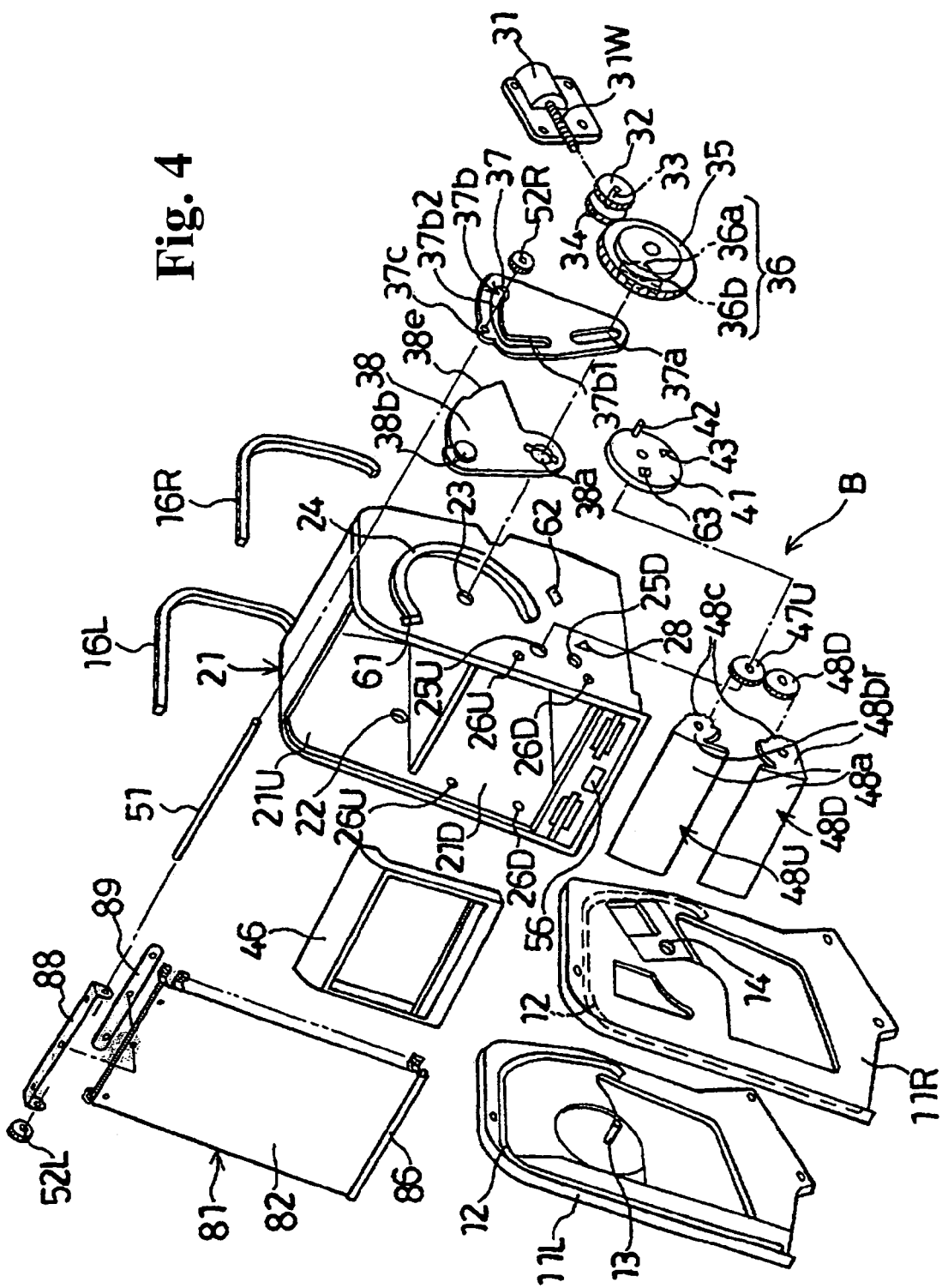
FIG. 4 is an exploded perspective view of the shielding system for a vehicle shown in FIG. 3.
Figure 5:
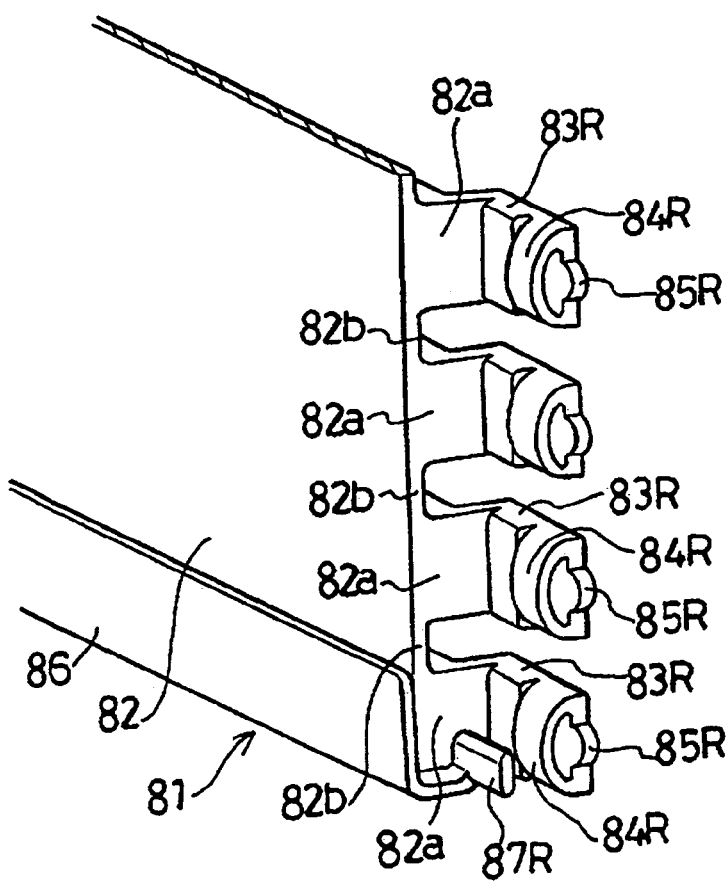
FIG. 5 is a partially enlarged view of the shutter member shown in FIG. 4.
Figure 6:
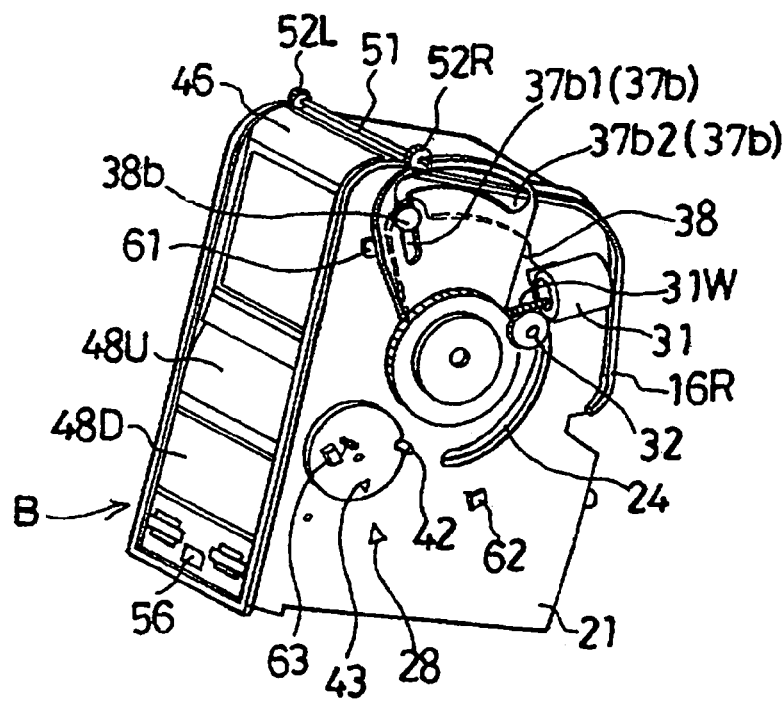
FIG. 6 is an explanatory view of the shielding system shown in FIG. 3 with both frames removed and a motor added.
Figure 7:
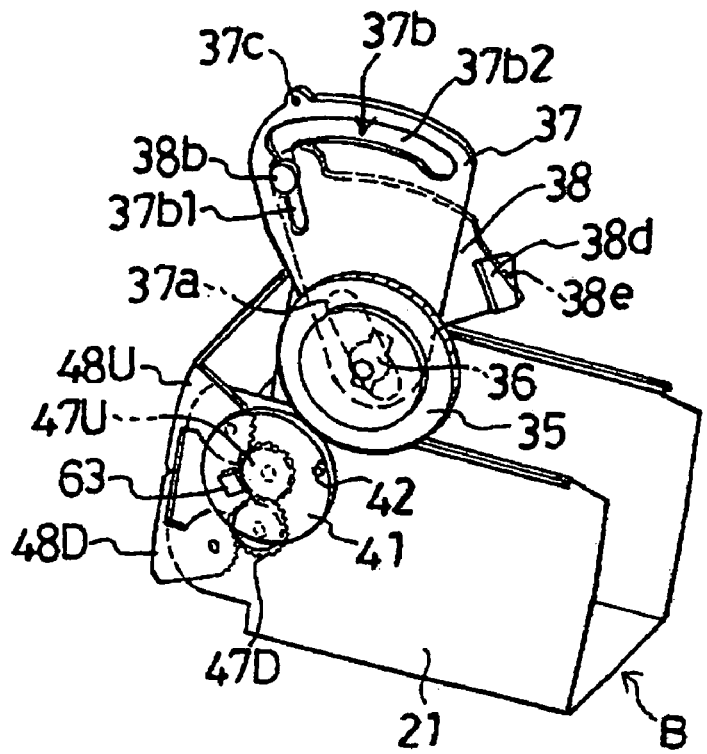
FIG. 7 is a perspective view of a mechanism for opening a cover.

Hereunder, embodiments of the present invention will be explained with reference to the drawings. FIG. 1 is a diagram showing an appearance of a shielding system for a vehicle installed in a center console with a shutter member closed according to an embodiment of the present invention. FIG. 2 is a diagram showing the appearance of the shielding system for a vehicle installed in a center console with the shutter member open. FIG. 3 is a diagram showing the appearance of the shielding system for a vehicle shown in FIG. 2. FIG. 4 is an exploded perspective view of the shielding system for a vehicle shown in FIG. 3. FIG. 5 is a partially enlarged view of the shutter member shown in FIG. 4. FIG. 6 is an explanatory diagram of the system shown in FIG. 3 with both frames removed and a motor added. FIG. 7 is a perspective view of a mechanism for opening a cover. FIGS. 8 to 12 are diagrams to explain an operation. A bump 38d of a rotating member 38 shown in FIG. 7 is omitted in the other figures. A shutter member is omitted in some figures.

In FIG. 1, reference C represents a center console, and the center console C is provided with a shielding system for a vehicle B and an operation button S for operating the shielding system for the vehicle B.

The shielding system for the vehicle B, as shown in FIG. 4, comprises left and right frames 11L and 11R fastened at lower ends within the center console C; a case 21 as a storage section disposed within and attached to the left and right frames 11L and 11R; a motor 31 as a drive source attached to the right side of the right frame 11R; a rotating member 38 connected to the motor 31; a drive member 37 connected to the rotating member 38 via a coupling device, which cancels the connection with the rotating member 38 via the coupling device and stops after moving a predetermined distance in synchronicity with the rotating member 38; a shutter member 81 driven by the drive member 37 to open and close the front face of case 21 (the opening of the storage section); and upper and lower covers 48U and 48D driven by the rotating member 38 to open and close the lower storage section 21D of the case 21. A predetermined spacing is employed between the right frame 11R and case 21, so that the parts (described later) can be disposed therein.

On the opposing surfaces of the left and right frames 11L and 11R, a guide groove 12 is respectively formed to guide both ends of a drive shaft 51 (described later) and both ends of the shutter member 81. The left frame 11L is provided on the side of the right frame 11R with a support pin 13 for supporting the case 21. The right frame 11R is provided with a shaft support hole 14, which rotatably supports the connection shaft 33 for connecting the later described worm wheel 32 and first transmission gear 34, and, on the side of the left frame 11L, a support pin (15) (not shown) for supporting the case 21.

References 16L and 16R represent left and right racks having teeth formed on peripheries thereof. The left rack 16L is attached to the left frame 11L on the side of the right frame 11R at the inner side of and in parallel with the guide groove 12, as shown in FIGS. 8-11. Similarly, the right rack 16R is attached to the right frame 11R on the side of the left frame 11L at the inner side of and in parallel with the guide groove 12. Left and right drive gears 52L and 52R attached at the two ends of the drive shaft 51 engage the left and right racks 16L, 16R.

The case 21 is provided, at top and bottom, with an upper storage section 21U and a lower storage section 21D. The case 21 is provided, on the left plate, with a through hole 22, through which the support pin 13 of the left frame 11L is inserted, and upper and lower shaft support holes 26U and 26D for rotatably supporting the upper and lower covers 48U and 48D. The case 21 is provided, on the right plate, with a shaft support hole 23, through which the support pin (15) of the right frame 11R is inserted; a guide rib 24, which is arc-shaped, centered around the shaft support hole 23, and projecting to the right, for guiding the rotating member 38 while maintaining a constant space between the right plate and the rotating member 38; upper and lower shaft support holes 25U and 25D for rotatably supporting the later described upper and lower gears 47U and 47D; upper and lower shaft support holes 26U and 26D positioned more forward than the upper and lower shaft support holes 25U and 25D for rotatably supporting the upper and lower covers 48U and 48D; and a triangular positioning mark 28.

The motor 31 is provided with a worm gear 31W. Reference numeral 32 represents a worm wheel that engages the worm gear 31. The worm wheel 32 is connected to the first transmission gear 34 with a connection shaft 33 so as to integrally rotate with the first transmission gear that is located to the left of the right frame 11R, which is interposed between the two. Reference numeral 35 represents a second transmission gear that engages the first transmission gear 34. The second transmission gear 35 is rotatably supported by the support pin (15) of the right frame 11R, which penetrates at the center of the gear.

Reference numeral 36 represents an engaging section disposed so as to project to the left at the center of the second transmission gear 35, and comprises a shaft section 36a, which rotatably engages with the slot 37a of the drive member 37, and a projection 36b, which has a slightly narrower width than the diameter of the shaft section 36a and projects a predetermined amount from the position that is 180 degrees symmetrical to the shaft section 36a. The support pin (15) of the right frame 11R pierces through the shaft section 36a, in the center.

The drive member 37 described above receives the engaging section 36 that is inserted thereto, and includes a slot 37a having a slightly wider width than the diameter of the shaft section 36a which is movable therein; a guide slot 37b as a coupling device; and a shaft support hole 37c positioned in the outer side of the guide slot 37b. The guide slot 37b comprises a radial guide slot 37b1 extending in substantially the same direction as the slot 37a and a circumferential (arc) guide slot 37b2 contiguous with the radial guide slot 37b1. The shaft section 36a and projection 36b of the engaging section 36 are fitted into the rotating member 38, which is provided with a fitting hole 38a for integrally turning with the second transmission gear 35; a projection 38b as a coupling device for moving along the guide slot 37b of the drive member 37; and a bump 38d cranked and projected to the right for turning on the later described third limit switch 63.

Reference numeral 41 represents a rotating disk rotatably attached to the upper shaft support hole 25D of the case 21, reference numeral 42 represents a pin to be driven attached to the rotating disk 41 so as to project to the right, and reference numeral 43 is a triangular positioning mark disposed on the right side of the rotating disk 41. Reference numeral 46 represents a front decorative plate attached to the front face of the upper storage section 21U of the case 21, 47U represents an upper gear rotatably attached to the upper shaft hole 25U of the case 21 so as to be situated to the left of and rotated integrally with the rotating disk 41, and 47D represents a lower gear rotatably attached to the lower shaft hole 25D of the case 21 so as to engage the upper gear 47U.

Reference numeral 48U represents an upper cover and 48D is a lower cover. The upper and lower covers 48U and 48D respectively comprise a front face section 48a, left and right bent sections (48bl) and 48br (left bent section 48bl is omitted in the figures) made by bending the left and right ends of the front face section 48a, and a gear 48c disposed at the rear end of the right bent section 48br. The upper cover 48U is rotatably attached to the upper shaft hole 26U of the case 21, engaging the gear 48c with the upper gear 47U. The lower cover 48D is rotatably attached to the lower shaft hole 26D of the case 21, engaging the gear 48c with the lower gear 47D. The upper and lower covers 48U and 48D are normally biased to the closing direction using a coil spring as a biasing device (not shown).

Reference numeral 51 represents a drive shaft rotatably inserted through the shaft support hole 37c, the two ends of which are guided by the guide grooves 12 of the left and right frames 11L and 11R. References 52L and 52R are left and right drive gears attached at the two end sections of the drive shaft 52 to engage the left and right racks 16L and 16R. The drive shaft 51 is connected to the shutter member 81, which is guided by the guide grooves 12 at both left and right ends.

Reference numeral 56 represents an operation button disposed in the lower section of the case 21. Reference numeral 61 represents a first limit switch attached to the right frame 11R and turned on when the shutter member 81 is closed. Reference numeral 62 is a second limit switch attached to the right frame 11R and turned on when the shutter member 81 is open. Reference numeral 63 is a third limit switch attached to the right face of the rotating disk 41 and turned on when the upper and lower covers 48U and 48D are open.

The shutter member 81, as shown in FIGS. 4 and 5, comprises a shutter section 82 integrally formed of thick sections 82a horizontally extending and thin sections 82b (provided for flexibility) horizontally extending and alternating in a vertical direction; left and right projections (83L) and 83R (the left projections 83L are omitted in the figures) provided to integrally project at the rear on the left and right ends of the thick sections 82a; hollowed and flexibly deformable arc-shaped left and right flexible front to rear rattle control sections (84L) and 84R (the left flexible front to rear rattle control sections 84L are omitted in the figures) provided integrally with the left and right projections (83L) and 83R toward the front to control front to rear rattling when inserted into the guide grooves 12 of the left and right frames 11L and 11R; semi-cylindrical left and right flexible sideways rattle control sections (85L) and 85R (the left flexible sideways rattle control sections 85L are omitted in the figures) provided at the end of and integrally with the left and right projections (83L) and 83R to control sideways rattling of the flexible material when inserted into the guide grooves 12 of the left and right frames 11L and 11R; a metallic end reinforcing member 86 having a U-shaped cross section attached to the lowermost thick section 82a by allowing the lowermost thick section 82a to fit into it to increase the rigidity of the shutter member 81; and left and right insertion sections (87L) and 87R (the left insertion section 87L is omitted) disposed with a shape that is vertically elongated to integrally project from the left and right sides of the end reinforcing member 86.

The shutter member 81, as shown in FIG. 4, is connected to the drive shaft 51 by being positioned between the left and right drive gears 52L and 52R, sandwiched, at the upper end, between the bracket 88 that is rotatably attached to the drive shaft 51 and a receiving member 89, and fastened with screws or the like.

An operation will be explained next. In the state wherein the opening of the case 21 is closed with the shutter member 81, each member is positioned as shown in FIGS. 1 and 6 to 8. When the operation button S is pushed while the shutter member 81 is closed, the controller (omitted in the figures) rotates the motor 31 in the direction to open the shutter member 81. Once the motor 31 begins rotating, the rotating member 38 begins rotating clockwise from the state shown in FIG. 8 via the worm gear 31W, worm wheel 32, first transmission gear 34, second transmission gear 35, and engaging section 36.

Once the rotating member 38 begins rotating, the first limit switch 61, which has been pushed by the rotating member 38 and has been turned on, is turned off. The drive member 37 rotates clockwise along with the rotating member 38 as it is pushed by the projection 38b of the rotating member 38 engaged with the radial guide slit 37b1. At this point, both ends of the drive shaft 51 and both left and right ends of the shutter member 81 are guided by the guide grooves 12, while the left and right drive gears 52L and 52R located at both ends of the drive shaft 51 engage the left and right racks 161 and 16R and move clockwise.

Figure 9:
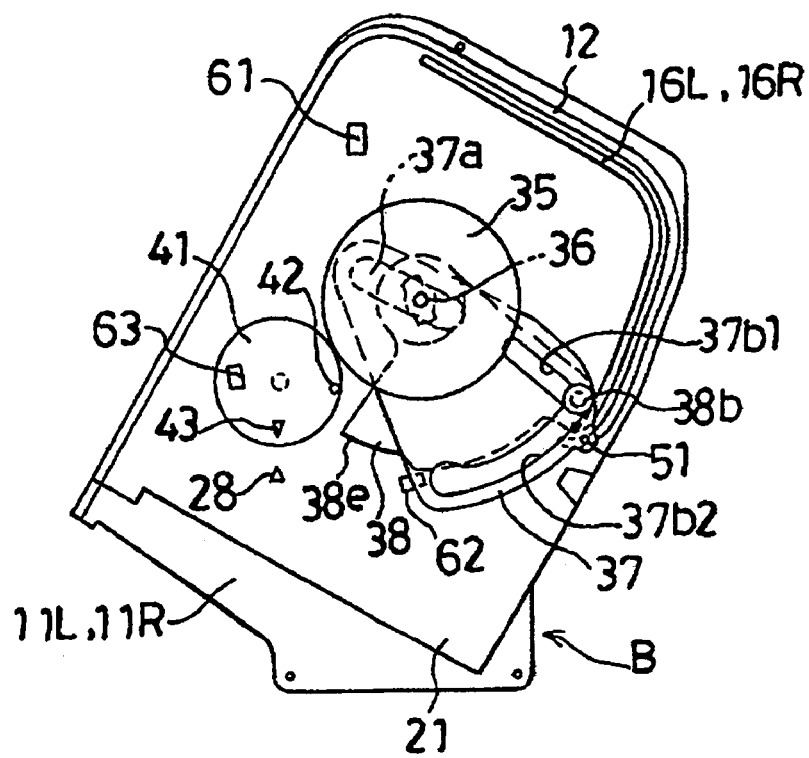
FIG. 9 is a view for explaining the operation.

In the state shown in FIG. 9, the second limit switch 62 is pressed by the rotating member 38 to turn on, and the controller stops the motor 31. In the state shown in FIG. 9, the front face of case 21 (the opening of the storage section) is open, as shown in FIG. 2, as the shutter member 81 moves upwardly. Thus, an occupant can listen to music, for example, by operating the audio system stored within the upper storage section 21U. In the state shown in FIG. 9, wherein the shutter member 81 is open, the upper and lower covers 48U and 48D are covering the front face of the lower storage section 21D, as shown in FIG. 3.

Figure 10:
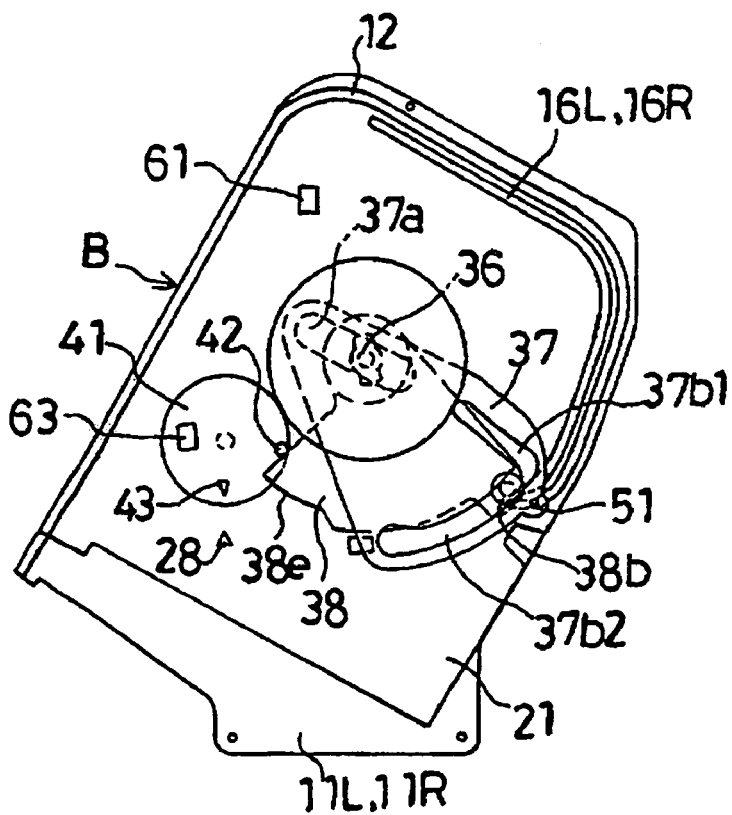
FIG. 10 is a view for explaining the operation.

In the state shown in FIG. 9, when the operation button 56 is pushed to open the front face of the lower storage section 21D by rotating the upper and lower covers 48U and 48D, the controller rotates the motor 31 in the same direction as that for opening the shutter member 81. Even if the motor 31 is rotated this way, the drive member 37 moves inwardly via the drive shaft 51 guided by the guide grooves 12, since the tips of the guide grooves 12 are curved inwardly (toward the shaft support hole 23), as shown in FIGS. 8 to 11. Accordingly, the projection 38b moves from the radial guide slot 37b1 to the circumferential guide slot 37b2, as shown in FIG. 10.

Figure 11:
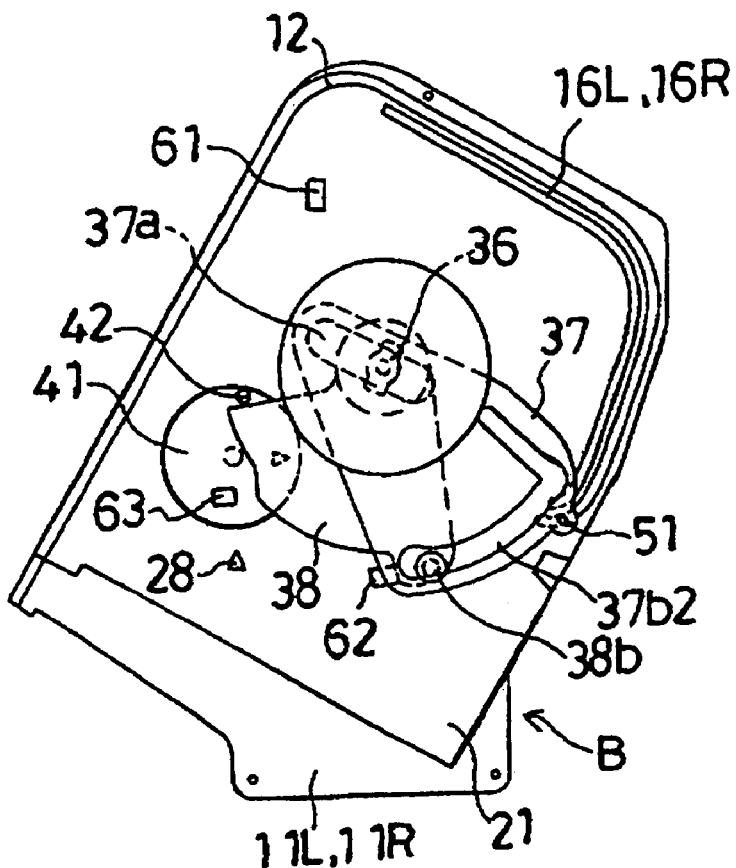
FIG. 11 is a view for explaining the operation.
Figure 12:
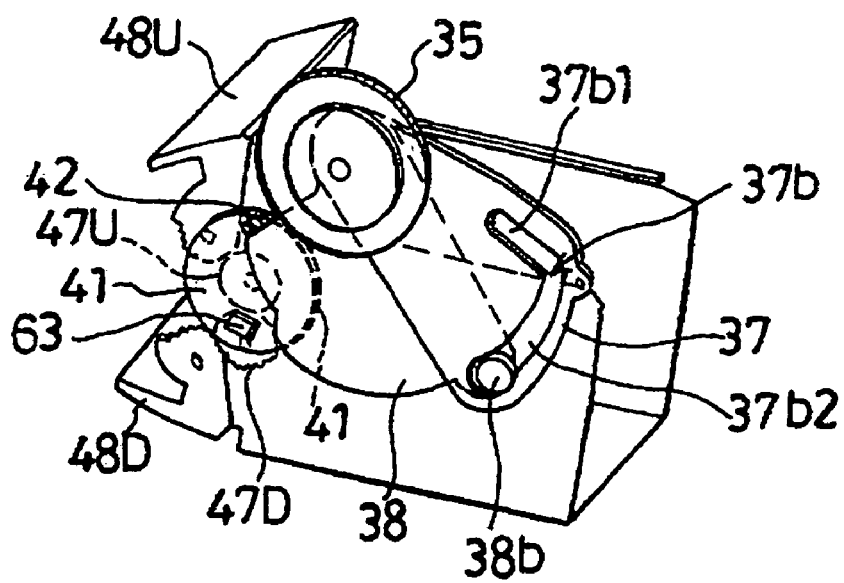
FIG. 12 is a view for explaining the operation.

Thus, even if the motor 31 rotates, only the rotating member 38 rotates clockwise without rotating the drive member 37. Once the rotating member 38 rotates as above, the rotating member 38 pushes the pin 42 to rotate the rotating disk 41 counterclockwise, thereby allowing the upper and lower covers 48U and 48D to rotate in the direction to open the lower storage section 21D via the upper and lower gears 47U, 47D, and gear 48c. Once the upper and lower covers 48U and 48D open the lower storage section 21D, as shown in FIG. 12, the third limit switch 63 is pushed by the rotating member 38 (the bump 38d) to turn on, as shown in FIG. 11, and, as a result, the controller stops the motor 31. Thus, the occupant can store an article in the lower storage section 21D or remove what has been stored in the lower storage section 21D.

Next, in the state shown in FIGS. 11 and 12, when the operation button 56 is pressed to rotate the upper and lower covers 48U and 48D and close the front face of the lower storage section 21D, the controller rotates the motor 31 in the direction to close the shutter member 81. Once the motor 31 is rotated to rotate the rotating member 38, the rotating member 38 rotates counterclockwise from the state shown in FIG. 11, and is no longer pressing the pin 42. Thus, the upper and lower covers 48U and 48D rotate to close the front face of the lower storage section 21D using the bias of the coil spring (not shown). The rotation of the upper and lower covers 48U and 48D in the direction to close the front face of the lower storage section 21D allows the rotating disk 41 to also rotate clockwise, as shown in FIG. 11, so that the third limit switch 63 is no longer pushed by the rotating member 38 (the bump 38d) and is turned off.

Once the rotating member 38 rotates counterclockwise from the state shown in FIG. 10, slightly more than the state shown in FIG. 9, positioning the second limit switch 62 at the stage 38e of the rotating member 38, the rotating member 38 no longer pushes the second limit switch 62, which is thus turned off. This causes the controller to stop the motor 31, allowing the upper and lower covers 48U and 48D to achieve the condition that closes the lower storage section 21D, with the shutter member 81 leaving the opening of the case 21 open. In this state, operating the operation button 56 again allows the upper and lower covers 48U and 48D to rotate to open the front face of the lower storage section 21D as described before.

Next, when the operation button S is pressed to allow the shutter member 81 to close the opening of the case 21 in the state wherein the upper and lower covers 48U and 48D have closed the front surface of the lower storage section 21D from the state wherein the upper and lower covers 48U and 48D had the lower storage section 21D open, as described above, or in the state wherein the shutter member 81 is open, as shown in FIG. 9, the controller rotates the motor 31 in the direction to close the shutter member 81. Accordingly, each part operates in reverse sequence of that described above.

In other words, since the projection 38b of the rotating member 38 pushes the edge of the radial guide slot 37b1 (circumferential guide slot 37b2) of the drive member 37, the rotating member 38 and the drive member 37 rotate counterclockwise integrally, and both ends of the drive shaft 51 move counterclockwise along the guide grooves 12. As a result, the projection 38b enters the radial guide slot 37b1 from the section where the radial guide slot 37b1 and circumferential guide slot 37b2 overlap.

Figure 8:
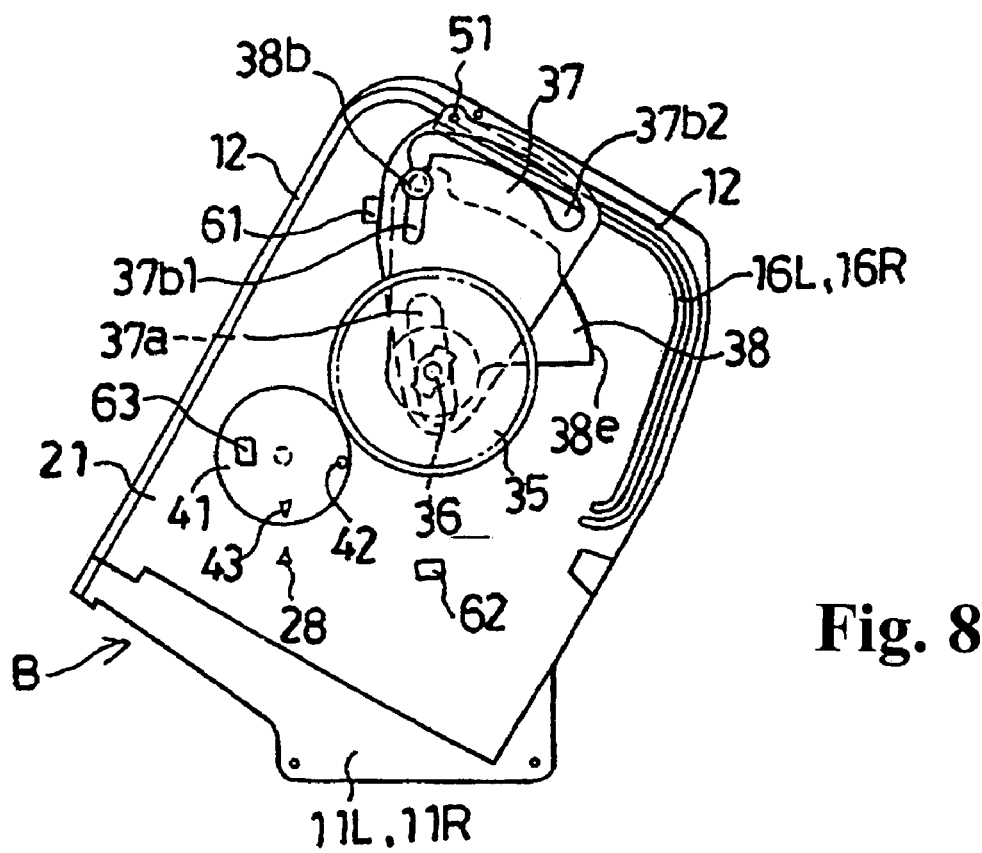
FIG. 8 is a view for explaining an operation.

Once the rotating member 38 and the drive member 37, among other elements, move counterclockwise to the state shown in FIG. 8, the opening of the case 21 is closed by the shutter member 81, and the first limit switch 61 is pushed by the rotating member 38 and turned on. Thus, the controller stops the motor 31. Furthermore, the second limit switch 62 that has been on in the state shown in FIG. 9 is turned off by the counterclockwise rotation of the rotating member 38.

When operating the operation button S as described above, an odd sequence of the operation turns on the second limit switch 62, stopping the motor 31, and an even sequence of the operation turns on the first limit switch 61, stopping the motor 31. The operation of the operation button S in the state wherein the upper and lower covers 48U and 48D leave the front face of the lower storage section 21D open, as shown in FIGS. 11 and 12, corresponds to an even sequence of operation, and thus, the first limit switch 61 turns on to stop the motor 31.

As described above, according to this embodiment of the present invention, since one motor, the motor 31, drives the rotating member 38 and drive member 37; the rotating member 38 drives the upper and lower covers 48U and 48D; and the drive member 37 drives the shutter member 81, the space needed for disposing the motor 31 is reduced. The storage space, therefore, can be utilized efficiently, and, at the same time, an inexpensive device for driving two members or a shielding system for vehicle B can be provided.

Moreover, since the coupling device comprises the projection 38b disposed in the rotating member 38 and the guide slot 37b disposed in the drive member 37, the space can be utilized efficiently, and the degree of freedom in the appearance design increased.

In addition, since the drive member 37 is movably connected to the rotating member 38 in the radial direction of the rotating member 38, the space can be utilized efficiently, and the degree of freedom in the appearance design increased. Furthermore, since the motor 31 is controlled to perform normal or reverse rotation at or around the point where the connection between the rotating member 38 and the drive member 37 using the coupling device is released, the drive source can be constructed inexpensively. Since the rotating member 38 is guided by the guide rib 24 of the case 21, the rotating member 38 can be turned without shaking.

In addition, by mounting the rotating disk 41 by aligning the positioning marks 28 and 43 provided, the motor 31 can be stopped in the condition wherein the upper and lower covers 48U, 48D are fully open. The left and right front to rear flexible rattle control sections (84L) and 84R and left and right flexible sideways rattle control sections (85L) and 85R provided on both left and right ends of the shutter member 81 (shutter section 82), and the left and right insertion sections (87L) and 87R additionally provided allow the shutter member 81 to move without rattling.

Figure 13:
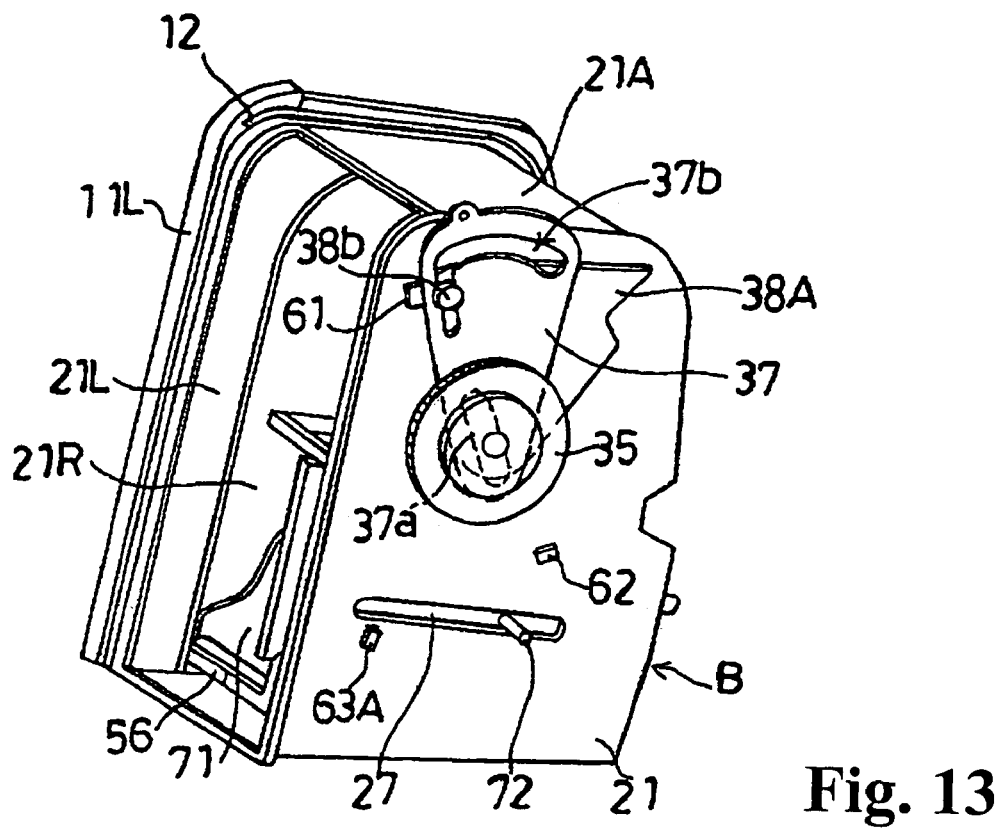
FIG. 13 is a perspective view of a shielding system for a vehicle with both frames removed according to another embodiment of the present invention.

FIG. 13 is a perspective view of the shielding system for a vehicle according to another embodiment of the present invention, with the frames removed, and FIGS. 14 to 18 are views to explain the operation. Although some reference numerals are omitted in these figures, the same or equivalent parts are given the same reference numerals for which the explanation is omitted.

In FIG. 13, reference numeral 21A represents a case as a storage section that is disposed within and attached to the left and right frames 11L and 11R. The case 21A has left and right storage sections 21L and 21R on the left and right sides. The case 21A is provided, on the left plate, with a through hole 22 through which the support pin 13 of the left frame 11L is inserted, and on the right plate, a shaft support hole 23 through which the support pin (15) of the right frame 11R is inserted, an arc-shaped guide rib 24 centered around the shaft support hole 23, and a guide slot 27 for guiding the later described pin 72 back and forth.

Reference 38A is a rotating member connected to the motor 31. The rotating member 38A is provided with a fitting hole 38a for the shaft 36a so that the projection 36b of the engaging section 36 is fitted to integrally rotate with the second transmission gear 35, and a projection 38b that moves along the guide slot 37b of the drive member 37. Reference 63A represents a third limit switch that turns on in the condition wherein the later described storage member 71 is advanced.

Reference numeral 71 represents a storage member as a driven member stored in the right storage section 21R, which slides back and forth, and is provided with a pin 72 on the right plate that moves along the guide slot 27. The storage member 71 is normally biased toward the retreated position (toward rear) by a coil spring, for example, as a biasing device (not shown). The left and right frames 11L and 11R, left and right racks 16L and 16R, motor 31, drive member 37, drive shaft 51, left and right drive gears 52L and 52R, operation button 56, first and second limit switches 61 and 62, and shutter member 81, which are not described here, are constructed the same and function the same as in the previous embodiment.

Figure 14:
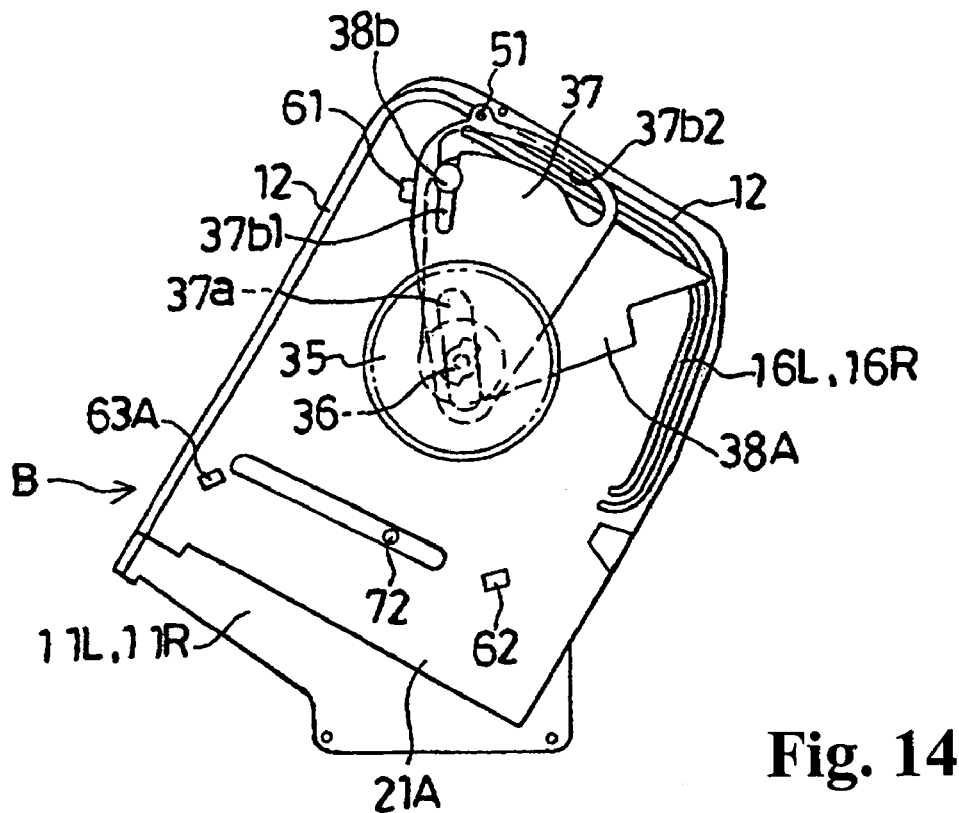
FIG. 14 is a view for explaining an operation.

An operation will be explained next. In the state wherein the opening of the case 21A is closed with the shutter member 81, each member is positioned as shown in FIGS. 13 and 14. When the operation button S is pressed in this state wherein the shutter member 81 is closed, the motor 31 is rotated in the direction to open the shutter member 81. Once the motor 31 rotates, the rotating member 38A begins rotating clockwise from the state shown in FIG. 14 via the worm gear 31W, worm wheel 32, first transmission gear 34, second transmission gear 35, and engaging section 36.

Once the rotating member 38A begins rotating, the first limit switch 37, which has been pressed by the rotating member 38A and has been on, is turned off. The drive member 37 rotates clockwise along with the rotating member 38A by being pressed by the projection 38b of the rotating member 38A that engages the radial guide slot 37b1. At this point, both ends of the drive shaft 51 and both left and right ends of the shutter member 81 are guided by the guide grooves 12. The left and right drive gears 52L and 52R disposed at the two ends of the drive shaft 51 engage the left and right rack 16L and 16R to move clockwise. Once the state shown in FIG. 15 is achieved, the second limit switch 62 is pressed by the rotating member 38A and turned on, and the controller stops the motor 31.

Figure 15:
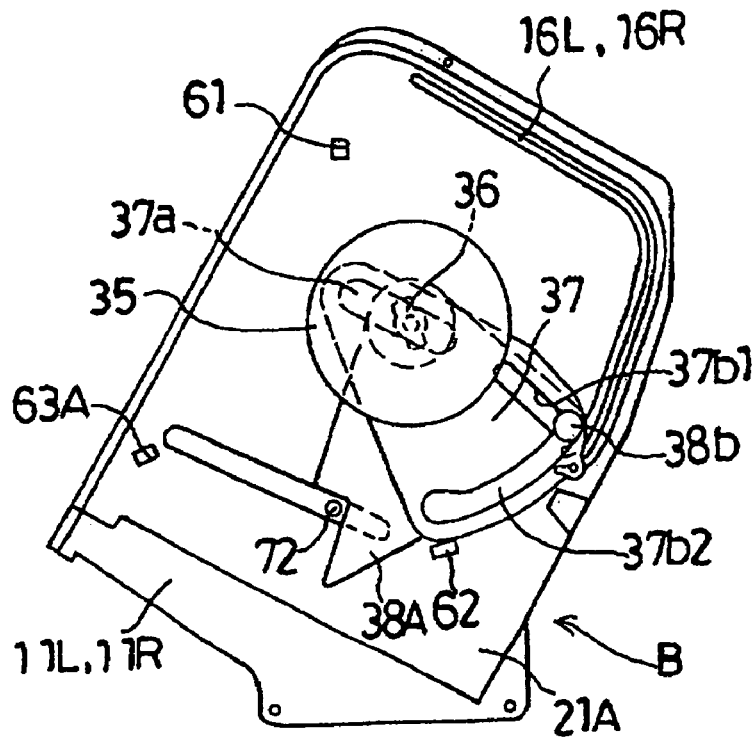
FIG. 15 is a view for explaining the operation.

In the state shown in FIG. 15, the shutter member 81 is moved upwardly, leaving the front face of the case 21A (opening of the storage section) open. Thus, the articles stored within the left storage section 21L can be removed. In the state wherein the shutter member 81 is open, as shown in FIG. 15, the storage member 71 is retreated, as shown in FIG. 13.

Figure 16:
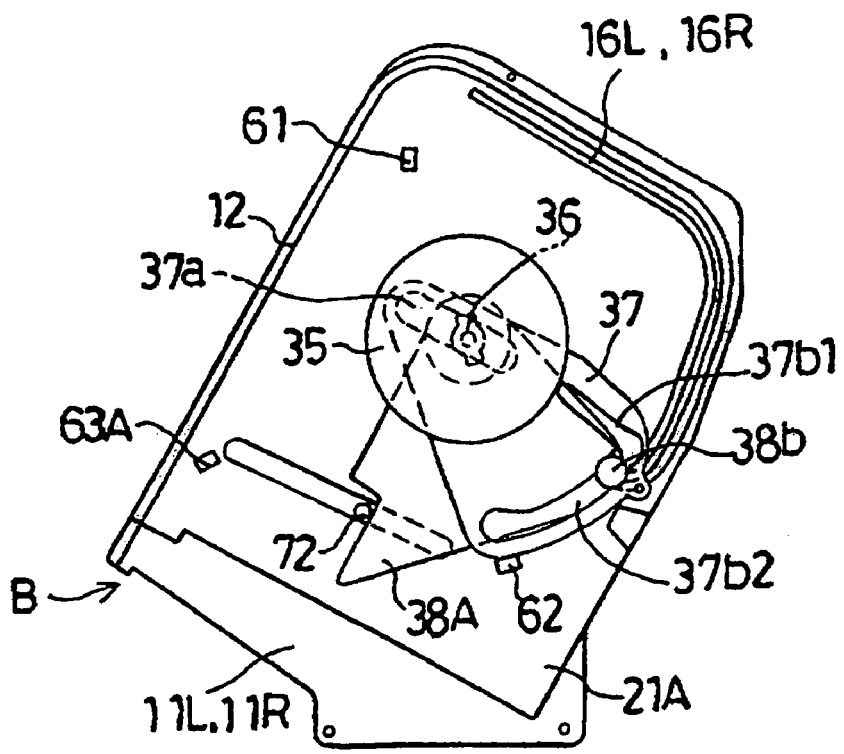
FIG. 16 is a view for explaining the operation.

In the state shown in FIG. 15, pressing the operation button 56 to move the storage member 71 forward will cause the controller to rotate the motor 31 in the same direction as that for opening the shutter member 81. Even if the motor 31 is rotated this way, the drive member 37 moves inwardly via the drive shaft 51 guided by the guide grooves 12, the tips of which are curved inwardly (toward the shaft support hole 23) as shown in FIGS. 14 to 17. Thus, the projection 38b, as shown in FIG. 16, moves from the radial guide slot 37b1 to the circumferential guide slot 37b2. Accordingly, even if the motor 31 rotates, only the rotating member 38A rotates clockwise without rotating the drive member 37.

Figure 17:
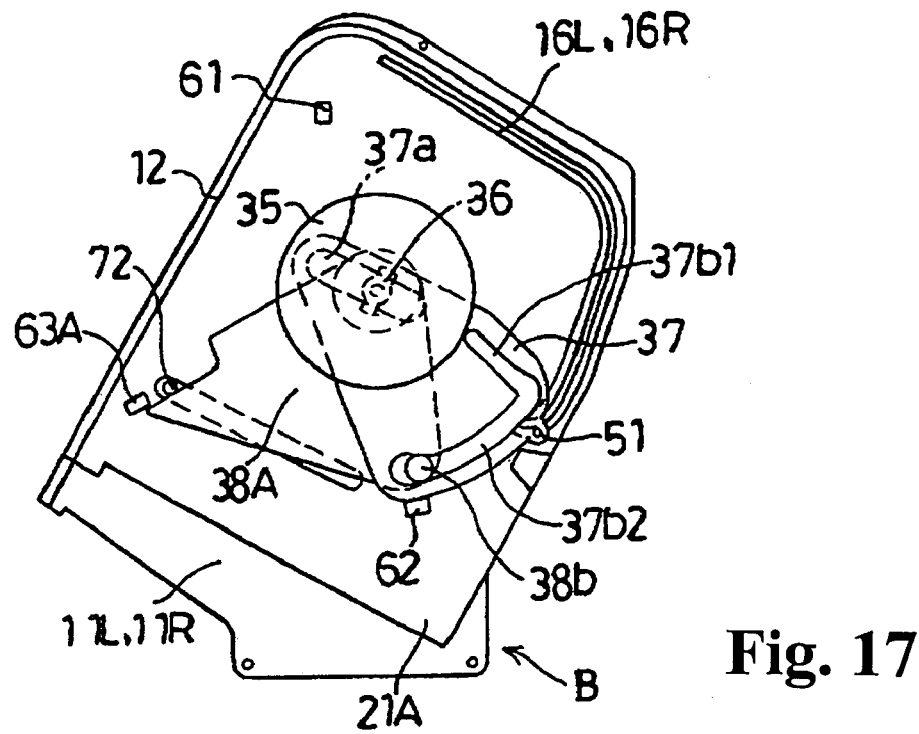
FIG. 17 is a view for explaining the operation.
Figure 18:
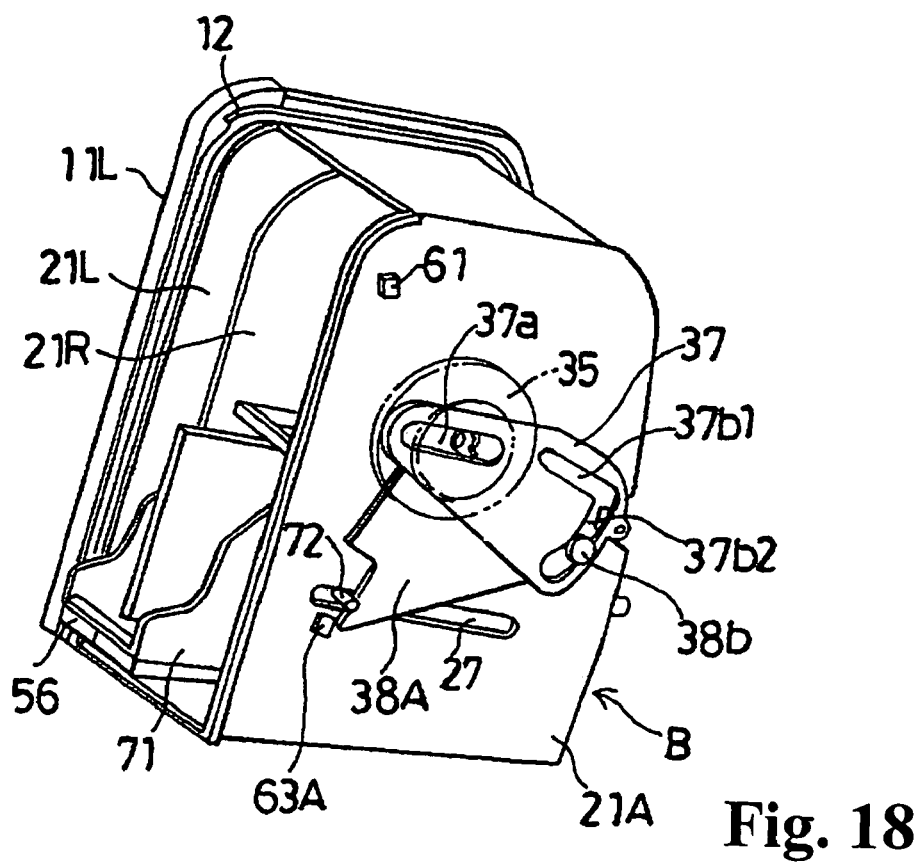
FIG. 18 is a view for explaining the operation.

Once the rotating member 38A rotates, the rotating member 38A presses the pin 72 to advance the storage member 71. When the storage member 71 achieves a desired advanced state, as shown in FIG. 18, the third limit switch 63A is pressed by the rotating member 38A and turned on, as shown in FIG. 17, and the controller stops the motor 31. Thus, an article can be stored within the storage member 71 or an article which has been stored in the storage member 71 can be removed.

Next, in the state shown in FIGS. 17 and 18, pressing the operation button 56 to allow the storage member 71 to retreat will cause the controller to rotate the motor 31 in the direction to close the shutter member 81. When the rotating member 38A is rotated by rotating the motor 31 as above, the rotating member 38A rotates counterclockwise from the state shown in FIG. 17, and is no longer pressing the driven pin 72. Thus, the storage member 71 retreats into the case 21A using the bias of the coil spring which is omitted in the figure. The counterclockwise rotation of the rotating member 38A ceases pressing the third limit switch 63A, which is thus turned off.

Once the rotating member 38A rotates clockwise from the state shown in FIG. 16 slightly more than the state shown in FIG. 15, the rotating member 38A stops pressing the second limit switch 62. Once the second limit switch 62 is turned off, the controller stops the motor 31 to retreat the storage member 71, with the shutter member 81 leaving the opening of the case 21A open. In this state, operating the operation button 56 again can advance the storage member 71, as described before.

Next, pressing the operation button S to allow the shutter member 81 to close the opening of the case 21A in the condition wherein the storage member 71 is retreated from the condition wherein the storage member 71 had been advanced, as described above, or in the condition wherein the shutter member 81 is open, as shown in FIG. 15, will cause the controller to rotate the motor 31 in the direction to close the shutter member 81. Accordingly, each part operates in reverse sequence of that described above.

In other words, since the projection 38b of the rotating member 38A pushes the edge of the radial guide slot 37b1 (circumferential guide slot 37b2) of the drive member 37, the rotating member 38A and the drive member 37 rotate counterclockwise integrally, and both ends of the drive shaft 51 move counterclockwise along the guide grooves 12. As a result, the projection 38b enters the radial guide slot 37b1 from the section where the radial guide slot 37b1 and circumferential guide slot 37b2 overlap.

Once the rotating member 38A and the drive member 37 move counterclockwise to the condition shown in FIG. 14, the opening of the case 21A is closed by the shutter member 81, the first limit switch 61 is pushed by the rotating member 81A and turned on. Thus, the controller stops the motor 31. Furthermore, the second limit switch 62 that has been on in the condition shown in FIG. 15 is turned off by the counterclockwise rotation of the rotating member 38A.

When operating the operation button S as described above, an odd sequence of the operation turns on the second limit switch 62, stopping the motor 31, and an even sequence of the operation turns on the first limit switch 61, stopping the motor 31. The operation of the operation button S in the condition wherein the storage member 71 is advanced as shown in FIGS. 17 and 18 corresponds to an even sequence of the operation, and thus, the first limit switch 61 turns on to stop the motor 31. In this embodiment, the same effect as the previous embodiment can be achieved.

In the above embodiments, the guide slit 37b is used as the slit for the coupling device, but the slit (guide slit 37b) may be replaced with a groove. The left and right front to rear flexible rattle control sections (84L) and 84R are disposed in front of the left and right projections (83L) and 83R. The left and right front to rear flexible rattle control sections (84L) and 84R may be disposed in rear of the left and right projections (83L) and 83R.

Moreover, the left and right front to rear flexible rattle control sections (84L) and 84R are hollowed out. The left and right front to rear flexible rattle control sections (84L) and 84R may be constructed otherwise, as long as they can prevent rattling. Furthermore, the operation button S operates the shielding system for the vehicle B. By setting a ignition-off position (position wherein the car key can be removed) as the operating position of the operation button S in an even sequence of the operation, while setting the accessory position of the ignition as the operating position of the operation button S in an odd sequence of the operation, instances wherein an occupant forgets to close the shutter member 81 can be eliminated.

The disclosure of Japanese Patent Application No. 2004-144723, filed on May 14, 2004, is incorporated in the application.

While the invention has been explained with reference to the specific embodiments of the invention, the explanation is illustrative and the invention is limited only by the appended claims.

What is claimed is:

1. A drive device for driving two members, comprising:
a drive source,
a rotating member connected to the drive source for driving one of the two members,
a coupling device connected to the rotating member,
a drive member adapted to be connected to the other of the two members for moving the same, said drive member engaging the rotating member through the coupling device to move for a predetermined distance together with the rotating member and disengaging from the rotating member through the coupling device to stop, and
a switch device for operating the drive source, said switch device being configured such that when the switch device is activated a first time, the rotating member moves together with the drive member to drive said one of the two members, and when the switch device is activated a second time, the rotating member moves alone without moving with the drive member to drive the other of the two members.

2. A drive device according to claim 1, wherein said coupling device includes a projection disposed on the rotating member and a groove provided in the drive member for guiding the projection.

3. A drive device according to claim 2, wherein said drive member is connected to the rotating member to be movable in a radial direction relative to the rotating member.

4. A drive device according to claim 3, wherein said drive member includes means for moving along a predetermined track so that the drive member moves radially relative to the rotating member.

5. A drive device according to claim 4, wherein said means for moving is a shaft engaging the track so that after the drive member rotates together with the rotating member, the drive member moves radially outwardly to allow the projection to move in a radial groove as said groove in the drive member to thereby freely rotate the rotating member relative to the drive member.

6. A drive device according to claim 1, wherein said drive source includes a motor capable of switching between forward rotation and reverse rotation when the rotating member is released from the drive member.

7. A shielding system for a vehicle comprising the drive device according to claim 1, a shutter member connected to the drive member as the one of the two members for opening and closing an opening of a storage section of the vehicle, and a cover connected to the rotating member as the other of the two members, independent from the shutter member, for opening and closing a portion of the opening of the storage section.

8. A shielding system for a vehicle comprising the drive device according to claim 1, a shutter member connected to the drive member as the one of the two members for opening and closing an opening of a storage section of the vehicle, and a storage member connected to the rotating member as the other of the two members for sliding back and forth within the storage section.

9. A drive device according to claim 1, wherein said switch device comprises a first operation button for moving the rotating member together with the drive member by operation of the drive source, and a second operation button to be actuated after the first operation button for moving the rotating member alone by operation of the drive source.

10. A drive device according to claim 9, wherein said switch device further comprises a first limit switch actuated when the rotating member starts to rotate, and a second limit switch actuated when the rotating member rotates for a predetermined distance.

* * * * *